(12) United States Patent
Cutler et al.

(10) Patent No.: US 12,602,813 B2
(45) Date of Patent: Apr. 14, 2026

(54) DEEP APERTURE

(71) Applicant: MICROSOFT TECHNOLOGY LICENSING, LLC, Redmond, WA (US)

(72) Inventors: Benjamin Franklin Cutler, Seattle, WA (US); Weiwei Yang, Redmond, WA (US); Spencer Fowers, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 597 days.

(21) Appl. No.: 17/960,741

(22) Filed: Oct. 5, 2022

(65) Prior Publication Data

US 2024/0119619 A1      Apr. 11, 2024

(51) Int. Cl.
H04N 7/15          (2006.01)
G06F 40/58        (2020.01)
(Continued)

(52) U.S. Cl.
CPC ............... G06T 7/70 (2017.01); G06F 40/58 (2020.01); H04N 7/15 (2013.01); *G06T 2207/30201* (2013.01)

(58) Field of Classification Search
CPC ... G06T 7/70; G06T 2207/30201; G06T 7/20; G06T 2207/30196; G06F 40/58;
(Continued)

(56) References Cited

U.S. PATENT DOCUMENTS

| | | | |
|---|---|---|---|
| 8,675,067 B2 * | 3/2014 | Chou | ..................... H04N 7/147 |
| | | | 348/149 |
| 10,789,912 B2 * | 9/2020 | Anderson | .............. G09G 5/003 |

(Continued)

FOREIGN PATENT DOCUMENTS

| | | | | |
|---|---|---|---|---|
| JP | H0568246 A | * | 3/1993 | |
| WO | WO-2018106211 A1 | * | 6/2018 | ......... G06K 9/00228 |
| WO | WO-2022087147 A1 | * | 4/2022 | ............ H04M 3/568 |

OTHER PUBLICATIONS

Roel Vertegaal, "GAZE-2: Conveying Eye Contact in Group Video Conferencing Using Eye-Controlled Camera Direction", Apr. 5, 2003 (Year: 2003).*

(Continued)

*Primary Examiner* — Atiba O Fitzpatrick
*Assistant Examiner* — Caleb L Esquino
(74) *Attorney, Agent, or Firm* — David Foster; Newport IP, LLC

(57)          ABSTRACT

The techniques disclosed herein enable a realistic, inclusive sense of physical presence for videoconference participants that is comparable to in-person communication. Multiple users are simultaneously provided with an immersive experience without the need for head-mounted displays or other wearable technology. Specifically, a real-time three-dimensional model of a scene at the remote end of the videoconference is received. At the same time, the location and perspective of each local participant is determined. Each local participant is then individually provided with a spatially correct stereoscopic view of the model. The sense of physical presence is created by changing what each local participant sees in response to a change in their perspective. The sense of physical presence is enhanced by enabling direct eye contact, clear communication of emotional state (Continued)

and other non-verbal cues, and a shared visual experience and audio ambience across locations.

20 Claims, 9 Drawing Sheets

(51) Int. Cl.
　　*G06T 7/70*　　　　(2017.01)
　　*H04N 13/282*　　　(2018.01)
(58) Field of Classification Search
　　CPC ...... H04N 23/90; H04N 12/282; H04N 13/20;
　　　　　　H04N 13/111–117; H04N 7/15–157;
　　　　　　H04N 7/142–144; H04N 13/239; H04N
　　　　　　13/243; H04N 7/14; H04N 21/4788;
　　　　　　G06V 40/16; G06V 40/18; H04L
　　　　　　65/403–4053; H04L 12/18–1895; H04M
　　　　　　　　　　　　　　　　3/56–569
　　See application file for complete search history.

(56)　　　　　　References Cited

U.S. PATENT DOCUMENTS

| | | | | |
|---|---|---|---|---|
| 11,812,194 | B1 * | 11/2023 | Vandyke | G06F 3/167 |
| 2009/0147070 | A1 * | 6/2009 | Marathe | H04L 51/10 |
| | | | | 348/E7.083 |
| 2013/0321564 | A1 * | 12/2013 | Smith | G06T 15/205 |
| | | | | 348/14.08 |
| 2014/0348342 | A1 * | 11/2014 | Laaksonen | H04R 3/005 |
| | | | | 381/92 |
| 2015/0042743 | A1 * | 2/2015 | Cullen | H04N 7/147 |
| | | | | 348/14.02 |
| 2015/0201278 | A1 * | 7/2015 | Bao | H04R 3/005 |
| | | | | 381/92 |
| 2018/0367787 | A1 | 12/2018 | Nakajima | |
| 2022/0122037 | A1 * | 4/2022 | Somlai-Fischer | |
| | | | | G06F 3/04812 |
| 2022/0286657 | A1 * | 9/2022 | Oz | H04N 7/157 |
| 2022/0309900 | A1 * | 9/2022 | Koike | H04N 7/14 |

OTHER PUBLICATIONS

International Search Report and Written Opinion received for PCT Application No. PCT/US23/032227, mailed on Jan. 23, 2024, 16 pages.
International Preliminary Report on Patentability received for PCT Application No. PCT/US23/032227, mailed on Apr. 17, 2025, 08 pages.

* cited by examiner

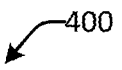

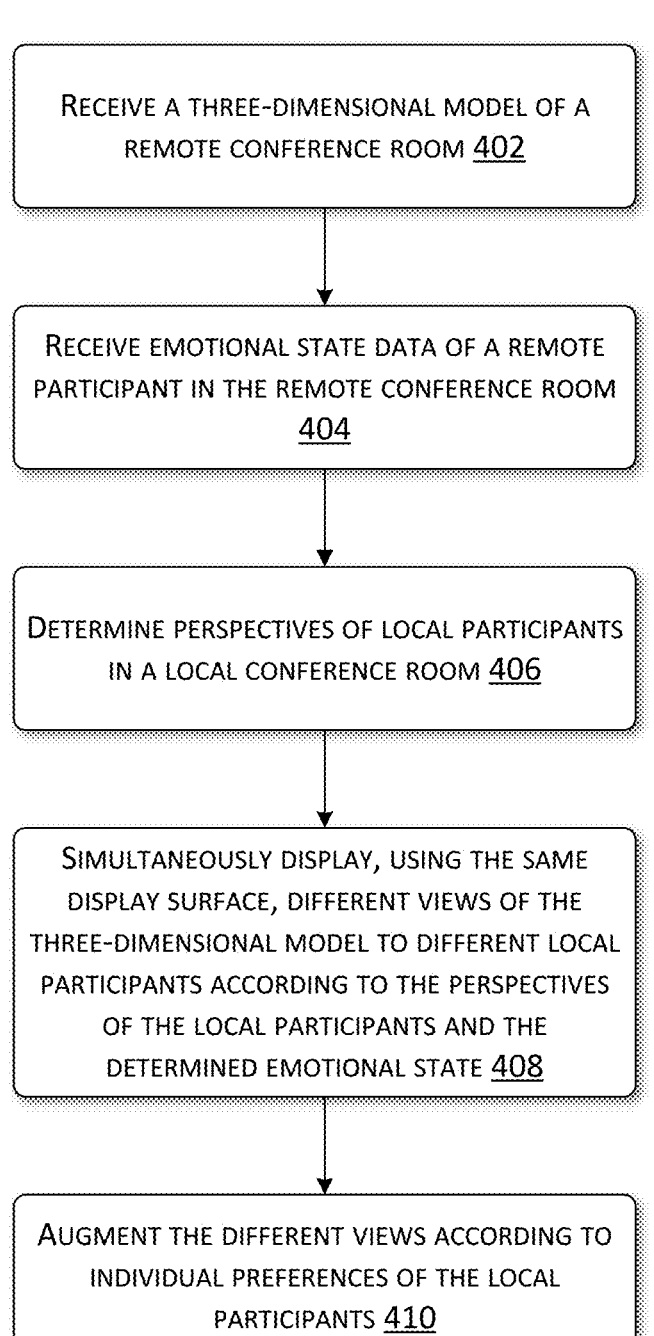

RECEIVE A THREE-DIMENSIONAL MODEL OF A REMOTE CONFERENCE ROOM 402

RECEIVE EMOTIONAL STATE DATA OF A REMOTE PARTICIPANT IN THE REMOTE CONFERENCE ROOM 404

DETERMINE PERSPECTIVES OF LOCAL PARTICIPANTS IN A LOCAL CONFERENCE ROOM 406

SIMULTANEOUSLY DISPLAY, USING THE SAME DISPLAY SURFACE, DIFFERENT VIEWS OF THE THREE-DIMENSIONAL MODEL TO DIFFERENT LOCAL PARTICIPANTS ACCORDING TO THE PERSPECTIVES OF THE LOCAL PARTICIPANTS AND THE DETERMINED EMOTIONAL STATE 408

AUGMENT THE DIFFERENT VIEWS ACCORDING TO INDIVIDUAL PREFERENCES OF THE LOCAL PARTICIPANTS 410

FIG. 4

Figure 6:
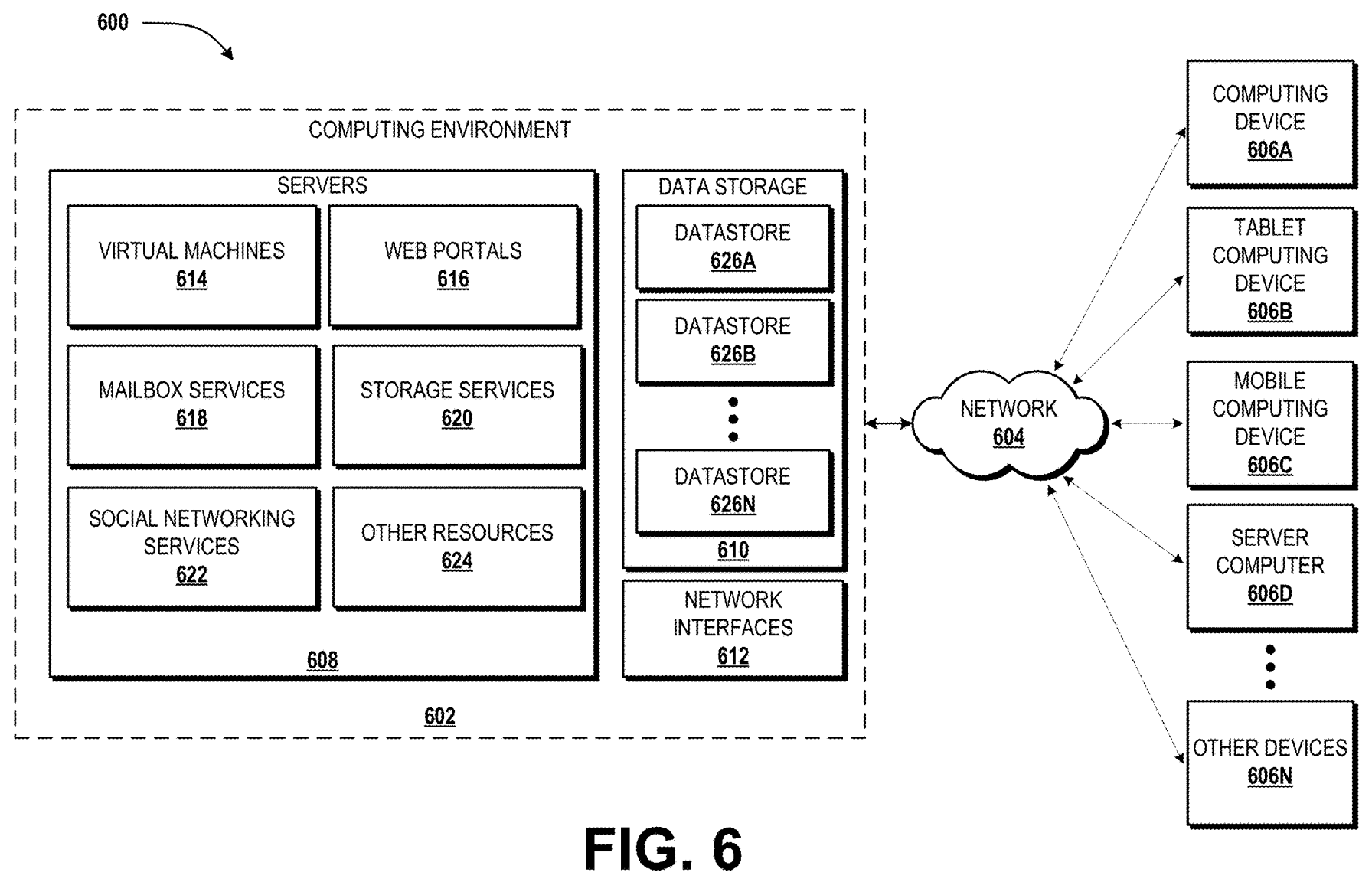

COMPUTING DEVICE 606A

TABLET COMPUTING DEVICE 606B

MOBILE COMPUTING DEVICE 606C

SERVER COMPUTER 606D

OTHER DEVICES 606N

NETWORK 604

COMPUTING ENVIRONMENT

SERVERS

VIRTUAL MACHINES 614

WEB PORTALS 616

MAILBOX SERVICES 618

STORAGE SERVICES 620

SOCIAL NETWORKING SERVICES 622

OTHER RESOURCES 624

608

DATA STORAGE

DATASTORE 626A

DATASTORE 626B

DATASTORE 626N

610

NETWORK INTERFACES 612

DEEP APERTURE

BACKGROUND

Videoconferencing enables people who are physically remote to see and hear each other. Traditional videoconferencing setups use a camera and microphone to capture a video of remote participants. The video is rendered on a local display where it can be viewed by local participants. Typically, the video has a fixed perspective—the perspective of the camera. As such, the content rendered on the local display is unaffected by a local participant moving around the conference room. In contrast, when participating in an in-person meeting, what a user sees and hears depends on their location in the room. Traditional videoconferences do not have this same sense of presence.

Virtual reality (VR) and augmented reality (AR) headsets are able to provide individual perspectives of a virtual meeting, but with the added expense and hassle inherent to wearable computing devices. While the weight and discomfort associated with wearable computing devices has been reduced, wearing any device for a long period of time, particularly over the head and eyes, is a burden to the user.

VR and AR based virtual meeting solutions generate a three-dimensional avatar for each meeting participant. However, the facial expressions and other non-verbal emotional cues of these avatars are often inaccurate. One reason for inaccurate emotional cues is that the headsets used to create the virtual reality experience obscure the emotional state of the people wearing them. For example, the screen of the headset casts darkness on the eyes of the wearer, preventing the observation of emotional cues indicated by eye movement. Another reason is that wearable computing devices—e.g. a headset and handheld controls—do not have the perspective to observe facial expressions, body language, or other indicators of the wearer's emotional state. Another reason is that machine learning techniques for generating emotional cues on an avatar tend to train on a narrow range of emotions, and as such are not capable of generating a full range of human emotions.

VR headsets also make it difficult if not impossible to determine the gaze of the wearer—i.e., to determine what the wearer is looking at. This makes it difficult if not impossible to recreate a sense of eye contact with a remote participant. A conversation without eye contact creates unease in the conversation and is another reason that emotional truth is not accurately conveyed to participants.

It is with respect to these and other considerations that the disclosure made herein is presented.

SUMMARY

The techniques disclosed herein enable a realistic, inclusive sense of physical presence for videoconference participants that is comparable to in-person communication. Multiple users are simultaneously provided with an immersive experience without the need for head-mounted displays or other wearable technology. Specifically, a real-time three-dimensional model of a scene at the remote end of the videoconference is received. At the same time, the location and perspective of each local participant is determined. Each local participant is then individually provided with a spatially correct stereoscopic view of the model. The sense of physical presence is created by changing what each local participant sees in response to a change in their perspective. The sense of physical presence is enhanced by enabling direct eye contact, clear communication of emotional state and other non-verbal cues, and a shared visual experience and audio ambience across locations.

A video conference enables participants at one end to see and hear participants at the other end. However, traditional video conferences utilize cameras, microphones, and displays to render a video of what is happening at the remote end. As discussed above, a video from the fixed perspective of the camera limits the sense of physical presence because the perspective of a participant does not affect the contents of the display. To overcome this limitation, a model generation engine generates a three-dimensional (3D) model of the remote scene and transmits it to a local computing device. The location, eye position, and other attributes of each local participant are identified and used to present each participant with a participant-specific, spatially correct view of the 3D model.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4 is a flow diagram of an example method for deep aperture video conferencing.

FIG. 6 is a diagram illustrating a distributed computing environment capable of implementing aspects of the techniques and technologies presented herein.

DETAILED DESCRIPTION

To address the above and other issues, techniques disclosed herein enable a realistic, inclusive sense of physical presence for videoconference participants that is comparable to in-person communication. Multiple users are simultaneously provided with an immersive experience without the need for head-mounted displays or other wearable technology. Specifically, a real-time three-dimensional model of a scene at the remote end of the videoconference is received. At the same time, the location and perspective of each local participant is determined. Each local participant is then individually provided with a spatially correct stereoscopic view of the model. The sense of physical presence is created by changing what each local participant sees in response to a change in their perspective. The sense of physical presence is enhanced by enabling direct eye contact, clear communication of emotional state and other non-verbal cues, and a shared visual experience and audio ambience across locations.

Figure 1:
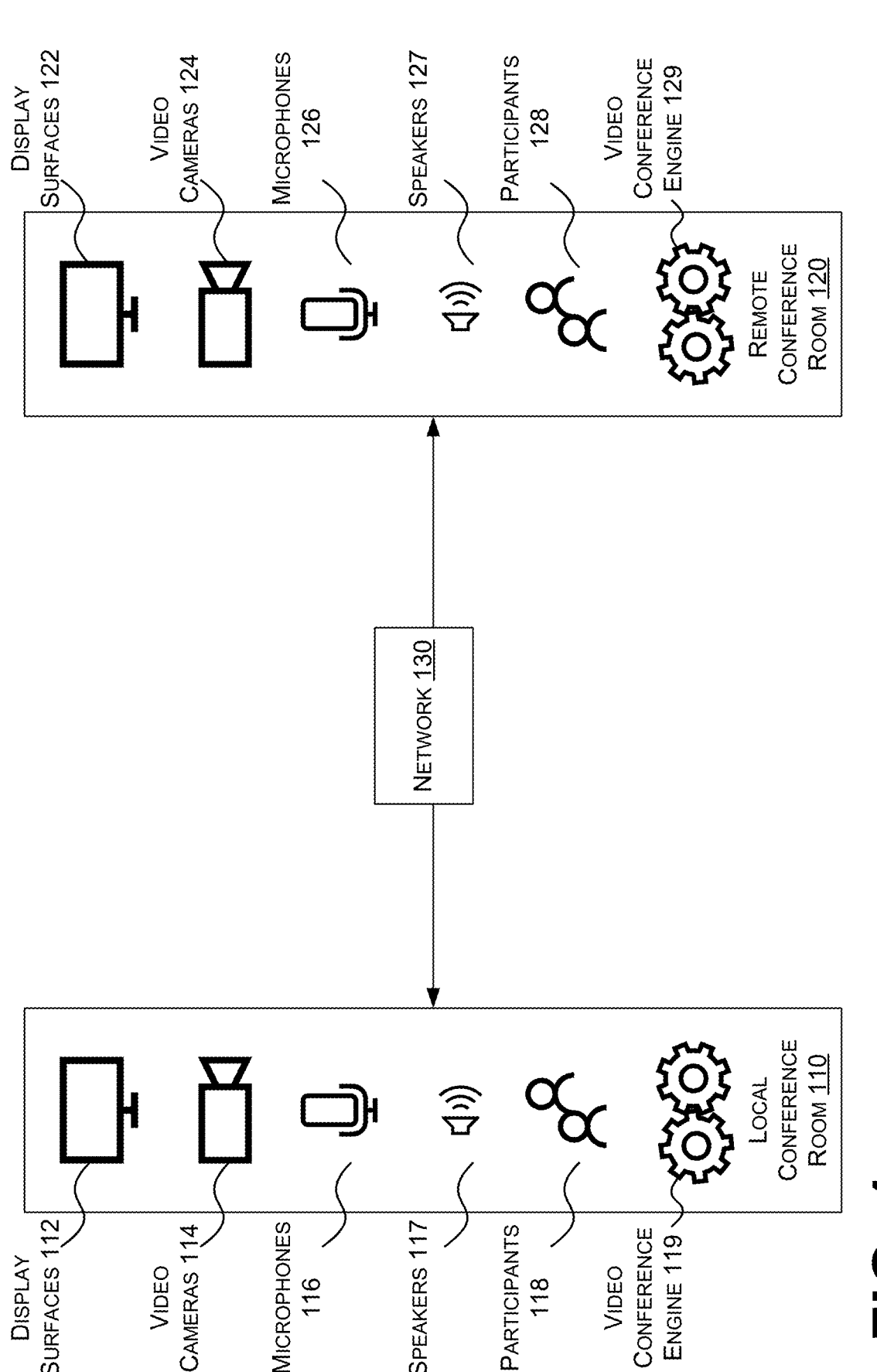
FIG. 1 illustrates local and remote endpoints of a video conference.

FIG. 1 illustrates local and remote endpoints of a video conference. Specifically, local participants 118 of local conference room 110 are engaged in a video conference with remote participants 128 of remote conference room 120. Throughout this document, conference rooms may be referred to as local or remote from the perspective of a participant. A conference room that is local to one participant may be remote to another participant. Also, while reference is made to conference rooms throughout this document, any space with a display surface, cameras, speakers, and microphones is similarly contemplated.

Video conference engine 119 of local conference room 110 utilizes display surfaces 112, video cameras 114, microphones 116, and speakers 117. Display surface 112 provides local participants 118 with an immersive experience of the scene at remote conference room 120. Specifically, video conference engine 119 works in conjunction with video conference engine 129 to render participant-specific views of a three-dimensional (3D) model of the scene at remote conference room 120. While referred to herein as a singular display surface, display surface 112 may comprise multiple display surfaces that are co-located, e.g. by arrangement in a tile pattern on a wall of conference room 110.

Figure 2:
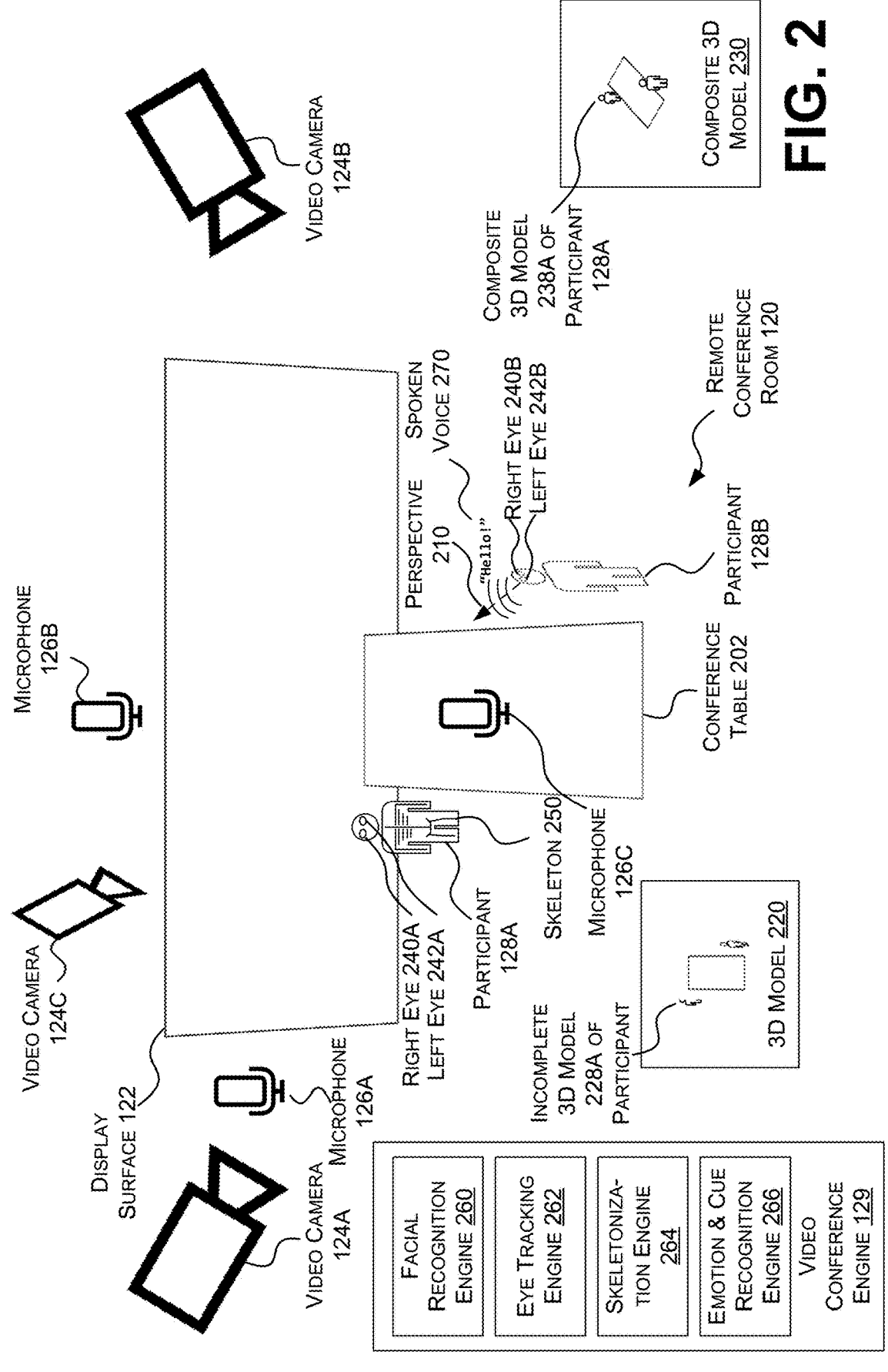
FIG. 2 illustrates generating a 3D model from video camera data.

FIG. 2 illustrates generating a 3D model from video camera data. Video cameras 124A, 124B, and 124C each capture video camera data from their respective fields of view of the scene at remote conference room 120. Video cameras 124 may be any type of video camera including red-green-blue (RGB) cameras, infra-red (IR) cameras, depth cameras, and the like.

In some configurations, video camera data from each of video cameras 124 is separately used to create individual 3D models of the scene at remote conference room 120. These individual 3D models may then be combined to create a more complete 3D model of the scene at remote conference room 120. In other configurations, video camera data from each of video cameras 124 is used collectively to synthesize a complete 3D model. For example, video conference engine 129 may generate an individual 3D model 220 from the video camera data captured by video camera 124A. Individual 3D model 220 may be composed with 3D models generated from data captured by video cameras 124B and 124C to create composite 3D model 230. Alternatively, video camera data captured by each of video cameras 124A, 124B, and 124C may be used to directly generate composite 3D model 230.

3D model 220 may be generated by identifying objects in the scene, including the contours and locations of each object. As illustrated, 3D model 220 includes 3D model 228A of participant 128A—a mathematical and texture-based visual description of participant 128A. 3D model 220 also includes contours and locations of conference table 202 and participant 128B.

As referred to herein, a contour refers to a surface of an object, such as the skin, hair, and clothing of human participants, or the surface, edges, and legs of a conference table. Contours are often stored as a wire mesh, a series of triangles, splines or other curves, among other known techniques. Computer vision algorithms may be applied to video camera data from RGB and/or IR cameras to identify objects in the scene, extract their contours, and identify their locations. Depth cameras may identify contours and distances directly, e.g. with a laser "time of flight" computation.

Each individual camera is only able to generate data from its field of view, which often only covers a limited portion of the overall scene. This is illustrated by incomplete 3D model 228A of participant 128A only depicting half of participant 128A. In order to generate a more complete 3D model, 3D model contour data derived from video data captured by multiple cameras is synthesized into a composite model 230. For example, by synthesizing contours from multiple cameras, composite 3D model 238A has more complete coverage of participant 128A. Textures extracted from RGB camera data may then be overlaid onto the synthesized contours. As discussed above, video camera data from multiple video cameras may be directly used to construct composite model 230. Once constructed, a video conference engine may render a view of composite model 230 from an arbitrary perspective.

Composite model 230 may be continuously updated to reflect the current scene at remote conference room 120. These changes are one reason that the view of model 230 that is rendered on display surface 112 may change. For example, participant 128B may sit down, causing any view of 3D model 230 that contains participant 128B to be updated to reflect this change. Additionally, or alternatively, the view of model 230 may be updated in response to a change in perspective of local participant 118. This is true even if there has been no change in the scene at remote conference room 120. For example, even if remote conference room 120 does not have any moving objects, the view of model 230 may still change based on the changing perspective of local participant 118. Enabling the view of model 230 to update as the perspective of local participant 118 changes enables an immersive sense of presence. As referred to herein, a view of a three-dimensional model refers to a rendering of the three-dimensional model from a particular perspective. For example, a view of a three-dimensional model may be a two-dimensional rendering of the model from a particular perspective and with particular lighting, among other parameters.

For example, as local participant 118 walks around local conference room 110, changing their perspective of display surface 112, the view of model 230 is updated to be true to the changing perspective. This creates an immersive sense of presence by simulating what local participant 118 would see if remote conference room 120 was actually adjacent to local conference room 110. The illustration of 3D model 230 shows one possible perspective of the scene at conference room 120, although any other perspective could be generated. When multiple local participants 118 are present in local conference room 110, 3D model 230 may be used to simultaneously generate multiple views, each from a different perspective, and each presented individually by display 112 to each of the multiple local participants 118.

In some configurations, facial recognition engine 260 of video conference engine 119 may analyze raw camera data and/or 3D model 230 to identify individual participants 128. For example, facial recognition engine 260 may be used to determine the identity of participant 128B from facial features and other distinguishing characteristics. Facial recognition may be used to track the location of different participants 128 as they move about the conference room 120. Participant identity is particularly relevant as it relates to accommodations and other participant-specific adjustments of the displayed content, which is discussed in more detail below in conjunction with FIG. 3C.

Eye tracking engine 262 of video conference engine 119 may use raw video camera data, depth and contour data, and/or model 230 to determine the location of right eye 240 and left eye 242 of each participant 128. In some configurations, a purpose-built eye tracking camera may be used. From the location and orientation of eyes 240 and 242, eye tracking engine 262 may determine a perspective 210 of each participant 128. Other eye information may be obtained based on eye location measurements taken over time, such as the velocity of eye motion.

Eye tracking information may be used when rendering composite 3D model 238A of remote participant 128A to recreate emotionally true eye-contact. For example, the eyes of remote participant 128A may be rendered consistent with their perspective. As referred to herein, perspective refers to where a participant is looking, and is a function of the location of the eyeballs and the direction in which they are pointed relative to their eye sockets. As a participant's eyeball rotates relative to its eye socket, the participant's field of view changes, changing their perspective. In this context, the location of the eyeballs are a proxy for the location of the retinas—the sensors which observe light for a participant. In some configurations, a participant's perspective may be determined based on the location and orientation of one eye. In some configurations, perspective may also include a focal point determined based on the perspective of both eyes.

If their line of sight passes within a defined distance of a local participant 118—based on the apparent location of local participant 118 on a remote display surface visible to remote participant 128A, the eyes of remote participant 128A may be rendered on display surface 112 so as to make eye contact with local participant 118. This facilitates emotional connection and a deeper level of communication.

Skeletonization engine 264 may also be applied to the raw video camera data, depth and contour data, and/or model 230 to identify skeleton 250, e.g. the location of body parts including the nose, mouth, arms, legs, torso, feet, and joints. As a participant moves throughout the conference room, turns their head, or makes other motions, the skeletonization engine 264 updates the locations of the key body parts. Skeletonization data may also be used to determine perspective 210, e.g. by identifying a location and orientation of a participant's head.

In addition to visual information, spatial audio information may be collected by an array of microphones 126 placed around the remote conference room 120. Spatial audio information may be used to determine where sound originated from and where it is directed. For example, video conference engine 129 may use a triangulation technique to infer a location of spoken voice 270 based on when the sound reached each of the microphones 126 and based on a known location of each microphone 126. As illustrated, the sound captured is "Hello!" and it originates from the location of participant 128B. In some configurations, conference room engine 129 processes the raw audio data into position, direction, volume, and transcription data, etc., that is transmitted to conference room engine 119. Additionally, or alternatively, raw audio data is transferred to conference room engine 119 for processing, e.g. for recreation or to perform spatial audio analysis.

In some configurations, participant locations and skeletonization information 250 may be used to pinpoint the exact origin and direction of sound generated by a participant. For example, if an array of microphones 126 triangulates the source of spoken voice 270 to within a defined distance of the mouth of participant 128B, then video conference engine 129 may infer that the sound originated from participant 128B. Similarly, the orientation of the head of participant 128B, as derived from skeletonization information 250, may be used to confirm a direction of the audio. Video conference engine 129 may then update model 230 with the adjusted sound location and direction, as well as the association of the sound with participant 128B.

In some configurations, before ascribing a sound to a particular participant, video conference engine 129 may filter out sounds that are not human—e.g., sounds that are outside the range of the human voice. The video conference engine 129 may also not ascribe a sound to a participant if the sound is of a human voice but the participant's mouth is closed or is otherwise determined to not be the source.

An emotional and non-verbal cue engine 266 may analyze body part locations and body movement from raw video data, skeletonization data, eye tracking data, depth/contour data, and/or spatial audio information to infer the emotional and other cognitive states of each remote participant. Once detected, these emotional and other cognitive states may be used when rendering a 3D representation of the participant. In some configurations, the emotional and non-verbal cue engine 266 is implemented in part with a machine learning model trained to associate emotional states with the observed data.

For example, affective states such as excitement, boredom, calmness, and anxiousness can be inferred from heart rate and heart rate variability (HRV) features extracted from RGB video. Heart rate can be extracted by averaging the pixel values of an exposed flesh (skin) portion of a person's image per frame per channel, and then running these averages for all the frames of a video though independent component analysis (ICA) to extract the heart rate component. Other cognitive states that may be determined based on video analysis include whether a participant is tired or stressed.

Attention can be inferred from gaze-tracking and pupil dilation dynamics. If the users are wearing additional sensors, such as an electroencephalogram (EEG) or an activity tracker, then this information can also be incorporated when rendering a view of the participant. For example, stress indicators can be extracted from a two-channel EEG sensor placed in the frontal region of the participant's head to measure alpha (8-13 Hz) band asymmetries.

When observing the emotional and cognitive states of participants over a long period of time, long term effects can be inferred. For example, if a participant is determined to have sustained attention throughout the meeting, this can be an indicator that the participant is fatigued. This indicator, in combination with other measures such as posture and tone of voice, may be used to render the participant as tired.

Models to generate cognitive indicators can be trained from data collected in controlled environments offline by exposing participants to various stimuli and tasks such as noise, light, mental math etc. Once robust and universal indicators are developed, they can be used on-line as is, or further refined (online learning) to adapt to a specific setting or user. While machine learning is typically used to extract these emotional/cognitive indicators, rule based techniques are also possible. For example, measuring a 250 bpm heart rate may trigger a rule indicating that the participant is under extreme stress.

The advantage of using emotional and cognitive states as additional input to rendering is that it can enable the rendered models to capture more subtlety and higher fidelity of their subject and respond more appropriately to situations, alleviating the "the uncanny valley" effect of near-realistic renderings. It can also improve user experience and improve digital wellbeing by making rendering more personalized. For example, it can be hard to identify a speaker in a scene with multiple people present. Taking cognitive state into account, the render can, for example, render a person of interest slightly brighter, or larger. The same idea applies to an object of interest in the scene—the cognitive state of a participant may be used to modify how the object of interest is displayed, e.g. increasing contrast with surrounding objects. Cognitive state can also give each participants a real-time indicator of how an interaction is perceived by others, similar to body language. For example, if someone is confusing their listeners in a presentation, real-time cognitive state indicators of participants can inform the speaker so that the speaker might re-adjust their presentation accordingly.

Other examples of emotional or other cognitive states that can be discerned from a participant include whether that person is paying attention or whether they are falling asleep. A rambling pattern and tone of speech may indicate nervousness. Fidgeting may indicate boredom.

While it is often enough to determine an emotional or cognitive state from video and/or audio data, other types of sensors may expand the types of cognitive states that may be deduced. Other types of sensors may also improve the certainty with which a cognitive state is deduced. For example, headsets or glasses may have embedded sensors that provide additional information about the participant who is wearing them. A pair of glasses may have an embedded EEG to measure brain activity. If the wearable has contact with the participant it may include a sweat sensor to measure perspiration. Strain, bend, and/or torque sensors embedded in glasses may be able to detect facial deformations indicative of smiles, grimaces, and other expressions that are consistent with various emotional states. Sensors embedded in glasses may also measure tilt, acceleration, or other physical characteristics of the wearer's head.

In some configurations, data collected with a more comprehensive suite of sensors may be used to evaluate the emotional state of participants that are wearing fewer if any additional sensors. Data collected with a more comprehensive suite of sensors may also be used to evaluate the emotional state of the same participants under different conditions.

3D renderings of a participant may be modified based on measured cognitive load and/or emotional state by replicating indications of the participant's state. For example, if a participant is determined to be surprised, a 3D representation of that participant may be rendered with eyebrows raised in a way that restores the emotional content originally expressed by the participant. Additionally, or alternatively, the 3D representation may be rendered in an exaggerated way, emphasizing the surprised emotional state of the participant. A participant determined to have a high cognitive load may be rendered with a slightly more furrowed brow to indicate they are deep in thought. Restoring emotional expression is important because a view of a 3D model may not convey emotion well. Specifically, the 3D model of a participant may not have complete fidelity with the numerous twitches, tilts, furrows, scrunches, or other facial motions that are indicative of emotion, as well as tilts, stretches, jitters, and other bodily motions.

In some configurations, emotional state is enhanced in a 3D model of a participant with a machine learning model. Specifically, the machine learning model may be trained on annotated sensor data taken of test subjects. Inputs to the model may be one or more video streams and any information derived therefrom, such as location data and perspective. Additional sensor data may also be provided as inputs to the model, such as an EEG reading, spatial audio, or a pressure sensor embedded in a pair of glasses. The model may also take as input an emotional state that was inferred by emotional and cue recognition system 266. The machine learning model may output modifications applicable to the 3D model representation of a participant, such as raising eyebrows, blushing, or averting eye contact. These modifications have the effect of making the 3D model more clearly express the emotion of the participant being depicted In some configurations, in addition to or as an alternative to augmenting facial expressions or otherwise modifying a 3D model of a participant according to emotional state, other techniques for displaying the participant's captured emotional state are similarly contemplated. For example, instead of or in addition to using a participant's heart rate to infer emotional state, a heart icon that beats in sync with the participant's actual heart rate may be displayed near the participant in the 3D model. In this case, the actual heart rate is a physiological measure. Visual depictions of physiological measures may be more common in a medical setting than a marketing presentation. Physiological measures may also be displayed near a participant in an education setting where heart rate and other measures may be indicative of confusion or boredom.

Figure 3A:
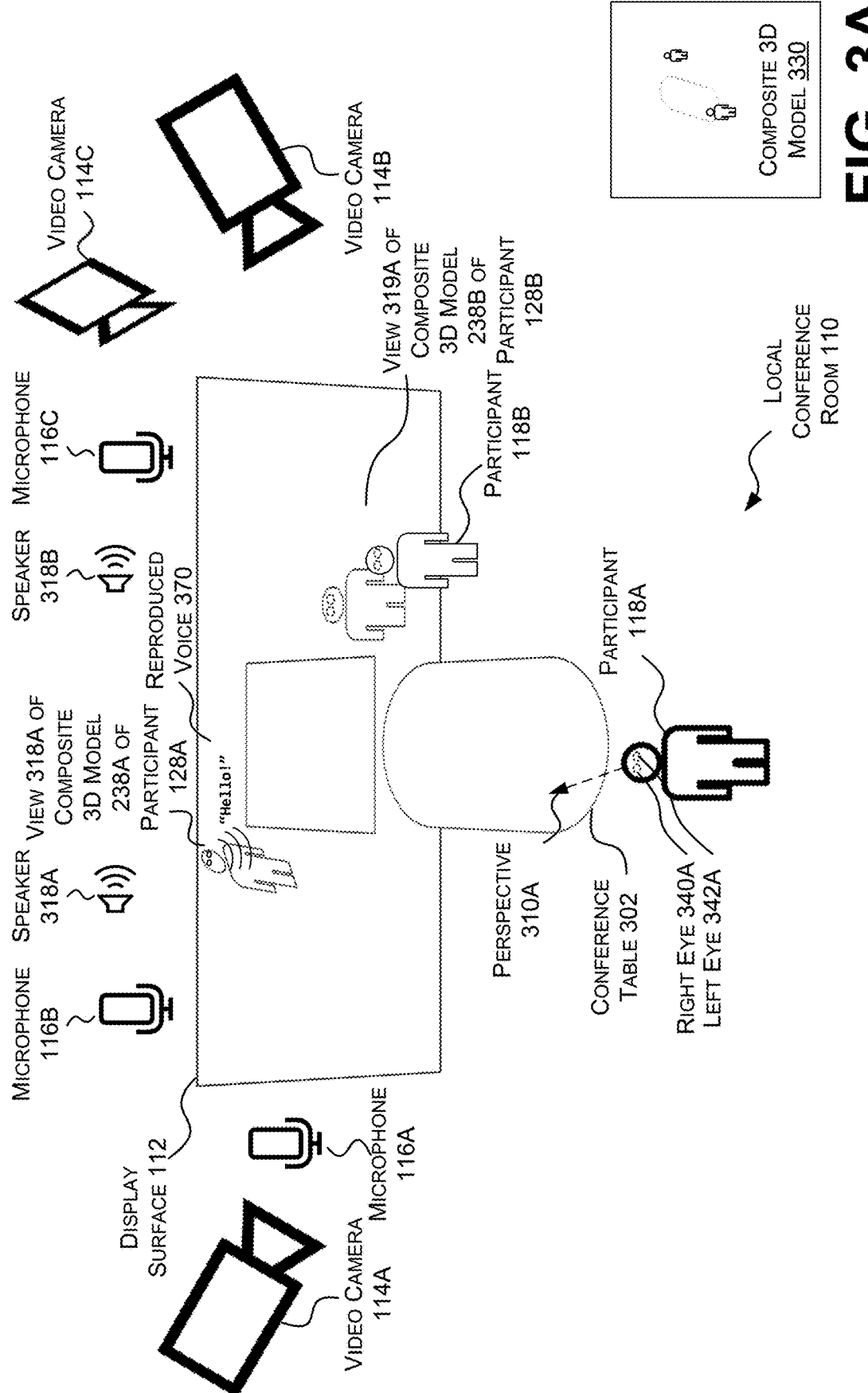
FIG. 3A illustrates a local participant in a local conference room viewing a 3D rendering of the scene at a remote conference room.

FIG. 3A illustrates local participant 118A in local conference room 110 viewing a 3D rendering of the scene at remote conference room 120. Specifically, 3D model 230 has been transmitted from video conference engine 129 to video conference engine 119. Audio data, emotional states, transcriptions, translations, and any other raw or processed data derived from remote conference room 120 and/or participants 128 may also be transmitted from video conference engine 129 to video conference engine 119. Display surface 112 is rendering a view of 3D model 230 that is specific to the perspective of local participant 118A. In some configurations, the perspective of local participant 118A is derived from raw camera data, skeletonization data, eye tracking data, or the like. The bold outline of local participant 118A indicates that the content depicted by display surface 112 is the content visible to local participant 118A. As discussed below in conjunction with FIG. 3C, local participant 118B may simultaneously see different content rendered by the same display surface 112.

In some configurations, in order for the video conference to be bi-directional, local video conference engine 119 generates composite 3D model 330 of local conference room 110, and transmits it to remote video conference engine 129.

Local video conference engine 119 may use a similar array of video cameras 114 within local conference room 110 to generate 3D model 330. 3D model 330 may also be transmitted to video conference engine 129 with additional information such as location data, eye tracking data, skeletonization data, spatial audio data, and the like.

In some configurations, video conference engine 129 applies operations similar to the operations discussed in conjunction with FIGS. 3A-3D. This allows participants 128 to view participant-specific views of conference room 110, enabling immersive bi-directional communication between the conference rooms.

In some configurations, display surface 112 is capable of simultaneously displaying different content to different locations in conference room 110. Each piece of content may span the entire display, and content targeted to one location is not visible from another location. This enables display surface 112 to simultaneously project different display content to different participants 118 in conference room 110. Participant 118A could be in a location such that display surface 112 appears to be displaying a football game, while participant 118B is in a location such that the same display surface 112 appears to be displaying a tennis match. Allowing different participants to simultaneously observe different content enables multiple participants 118 located in conference room 110 to simultaneously view the scene at remote conference room 120 from their own perspective. Display surface 112 may simultaneously display different content to different locations using a lenticular lens, multi-lenslet arrays, light fields, or other technologies that can simultaneously present multiple pieces of content from a single surface.

The ability to display different content to different locations may be refined enough that display surface 112 may be capable of directing different display content to each eye of each participant 118. The ability to project different display content to different eyes enables stereoscopic vision—a technique that provides different 2D images to each eye, but which together are interpreted as a 3D image. Each participant 118 may be provided with their own stereoscopic rendering of the remote conference room 120. Simultaneously tracking the location and perspective of each participant 118 and simultaneously providing each participant 118 with their own participant-specific stereoscopic rendering of remote conference room 120 enables an immersive teleconference experience without the burden of AR or VR headsets.

Raw video data, skeletonization data, eye tracking data, or data from the local 3D model 330 may be used to infer a perspective 310 of each local participant 118 in real-time. Each participant's perspective 310 refers to the location of that participant's eyes 340, 342, and their orientation. As referred to herein, eye orientation refers to a direction in which the eye is pointed. The direction may be determined as a vector from the location of the eye to a center point in the field of view of the participant. For example, if the participant is looking directly at a pencil on the conference table—such that the pencil is in the center of their field of view—their eye orientation would be a vector from the location of the eye to the pencil. In some configurations, a participant's perspective is represented as a point in space indicating where the participants eyes are located and a vector indicating where the participant is looking.

The perspective of each local participant 118 is used to generate a participant-specific view of the remote 3D model 230. As referred to herein, generating a view refers to creating a 2D image of a 3D model from a participant's perspective, while generating a stereoscopic view refers to generating two views of the 3D model, one from the perspective of each eye of the participant.

Views are created by placing the perspective, display surface 112, and the 3D model 230 into a 3D coordinate space. The perspective of a local participant is placed in the 3D coordinate space according to its location in conference room 110. Display surface 112 is located in the 3D coordinate space where display surface 112 is located in conference room 110. 3D model 230 is located in the 3D coordinate space as if it was adjacent to conference room 110, and as if it could be accessed by walking through display surface 112. A viewport used to generate the 2D image is placed in the 3D coordinate space with the size and location of display surface 112. The view is generated by determining, from 3D model 230, the colors of light that pass through the viewport on their way to the participant's perspective.

Displaying a view of the 3D model 230 on display surface 112 that dynamically updates in response to changes in the participant's perspective and in response to changes in the scene at remote conference room 120 has the effect of creating a window into remote conference room 120. If display surface 112 is large enough, an illusion is created that remote conference room 120 is adjacent to local conference room 110 such that one could walk between them. Dynamically updating display surface 112 based on updated perspectives and based on changes to the scene at remote conference room 120 enables participants to look around, walk around, move closer or further away from the display surface 112, or otherwise interact with remote participants as if they were in the same room. Effects like parallax further the illusion that remote conference room 120 is adjacent to local conference room 110.

As an alternative to creating the illusion that remote conference room 120 is adjacent to local conference room 110 and remote participants 128 are situated within remote conference room 120, display surface 112 may be used to create the illusion that local conference room 110 is larger than it really is, and that remote participants 128 are situated within the apparent extension of local conference room 110. For example, raw video camera data and/or 3D model 330 may be analyzed to determine a type of wall, flooring, lighting, and/or furniture, etc., found in local conference room 110. These aspects of local conference room 110 may be overlaid onto the geometry of remote conference room 120, e.g., replacing the flooring, walls, ceilings, and furniture of remote conference room 120 with renderings consistent with local conference room 110. Remote participants 128 may then be rendered within the apparent extension of local conference room 110.

Making remote participants 128 appear to be located in an extension of local conference room 110 is one example of augmenting, removing, or replacing some aspect of remote conference room 120. In some configurations, the size, shape, and other properties of remote conference room 120 may be modified. For example, the apparent size of remote conference room 120 may reduced to create a cozy atmosphere, or increased to create the impression of greater status. Objects, such as plants or windows, may be added to or removed from the rendering of remote conference room 120. In some configurations, the rendering of remote conference room 120 may be replaced with a synthetic or partially synthetic environment, creating an illusion that remote participants 128 are not in either conference room but a different location entirely. Similar changes may be made to the apparent location of local participants 118 as they are rendered in remote conference room 120.

Views for local participants 118 are provided to display surface 112 for display. Each view is supplied with a location in space that defines where the view should be visible. Locations in space may be defined with a coordinate system, e.g. a Cartesian coordinate system that is relative to the location of display surface 112. Locations in space may be point locations or volumes of space within which a particular view should be visible. With this information, display surface 112 projects participant-specific content to the current location of each participant.

In some configurations, the locations in space where a view should be visible is derived from participant location data and/or eye location data. Participant location data and eye location data may be derived from raw video camera data, e.g. by applying an algorithm to raw video camera data that identifies participants, faces, eyes, pupils, and/or gaze direction. Eye location may also be determined with specific eye tracking cameras.

If stereoscopic vision is enabled, display surface 112 may be provided with content specific to the left eye of each participant and content specific to the right eye of each participant, along with the locations in space of each eye. Display 112 may then project this participant-specific content to the left and right eyes of each participant 118. With stereoscopic vision, participants 118 interpret their left eye and right eye views as a spatially correct 3D rendering of the remote scene.

In some configurations, microphones 116 and speakers 318 in both conference rooms enable a unified spatial audio experience. Spatialized audio reproduction refers to techniques for simultaneously delivering a different audio stream to each participant. In some configurations, spatialized audio is performed with directional sound projection—the use of constructive and destructive interference of sound generated by multiple speakers. Directional sound projection also enables the sounds received by each participant 118 to appear to come from anywhere in remote conference room 120. As a result, local participants 118 hear each other as they normally would, while remote participants are heard as if they actually occupied the space they appear to occupy in the 3D rendering of remote conference room 120.

Each conference room may also include additional microphones and speakers for the purpose of identifying and canceling out far-field noise—sound from outside the conference room such as people speaking in the hallway or a leaf blower outside of the building. For example, additional microphones may be used to triangulate the location of particular noises, and determine that they originate outside of the conference room. In some configurations, once far field noise is identified it may be filtered out from the audio data transmitted to the other conference room. In other configurations, video conference engine 129 identifies which audio data has been identified as far field noise, allowing video conference engine 119 to alter or remove it. In some configurations, noise cancelling may be applied to reduce or eliminate far-field noise in the conference room where it was recorded.

Sounds that originate in a conference room—near-field sounds—such as a person tapping the table—may be shared across conference rooms, providing a rich and spatially accurate experience for all participants. One effect of sharing near-field sounds is creating a shared awareness of distractions, which is part of the communal experience.

In some configurations, video conference engine 119 combines spatial audio data received from video conference engine 129 with the locations of local participants 118 to better approximate the experience of being together in a single conference room. For example, not only is sound reproduced in local conference room 110 to appear as if it came from the apparent source in conference room 120, the volume is consistent with the apparent distance between the source and the listener. Specifically, the closer two participants from different conference rooms appear to be, the louder they sound to each other. If two participants are far enough away, and if the sounds they make fall below a defined threshold, they may not be able to hear one another at all.

FIG. 3A is illustrated from the perspective of participant 118A, which is indicated by the bold outline of user 118A. Participant 118A is configured to communicate without enhancement or other accommodation. As such, the spoken voice 270 recorded by microphones 124 may be reproduced by speakers 318 so that participant 118A can hear what participant 128A said—"hello!".

Figure 3B:
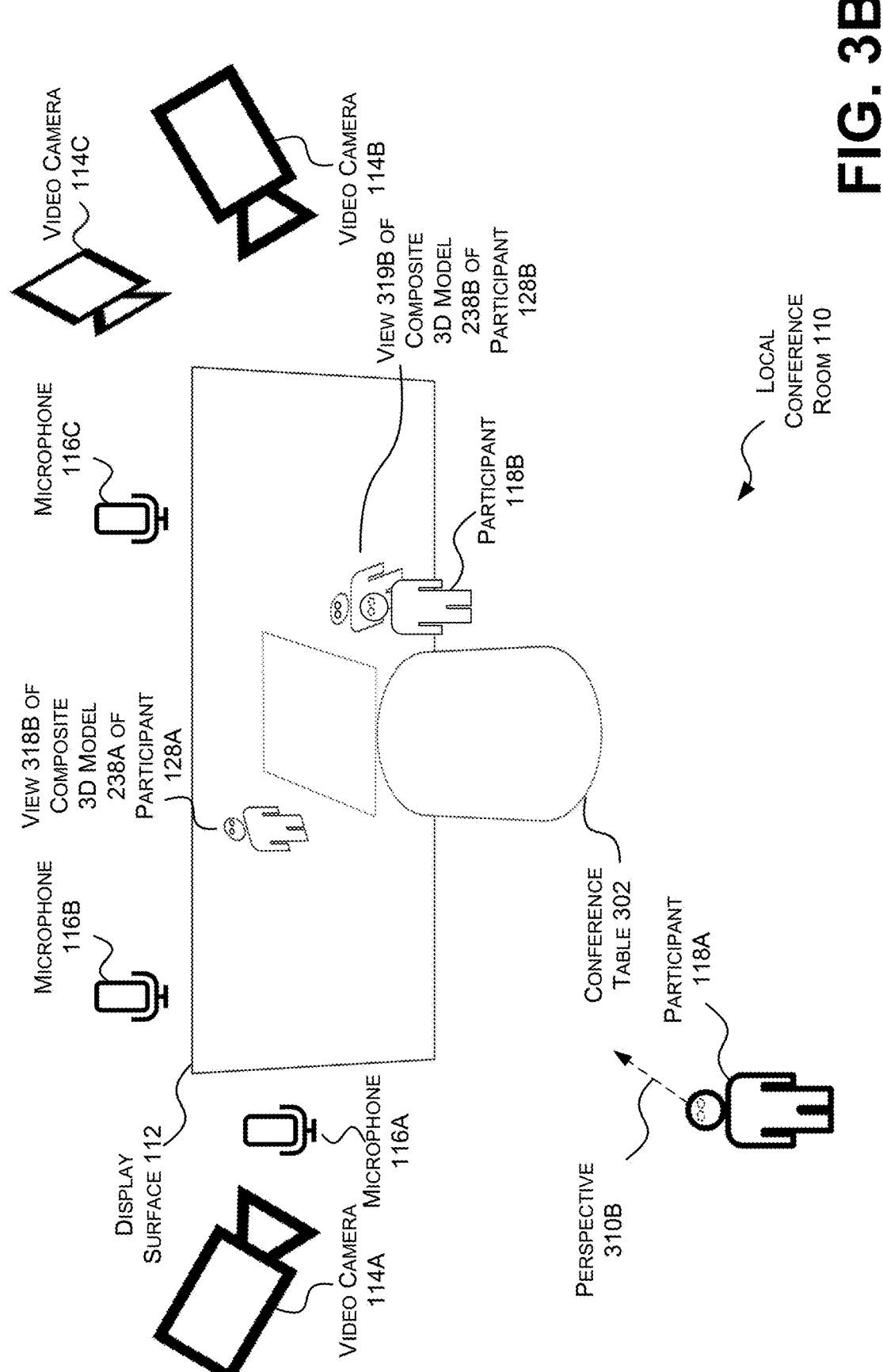
FIG. 3B illustrates the local participant viewing a 3D rendering of the scene at a remote conference room from a different perspective.

FIG. 3B illustrates local participant 118A viewing a 3D rendering of remote conference room 120 at a later point in time and from a different perspective. In FIG. 3B, local participant 118A has a new perspective having moved across the room 110, and so video conference engine 119 has updated the view of composite model 230 visible to participant 118A. Any change to the scene at remote conference room 120 will also be reflected in the updated view. In addition to the updates visible at the time depicted in FIG. 3B, the perspective of participant 118A and the scene at remote conference room 120 would have been periodically if not continuously monitored and updated while participant 118A walked to the position depicted in FIG. 3B. While walking around conference room 110 is how the perspective of participant 118A changed in FIG. 3B, any other type of change in the perspective of participant 118A is similarly contemplated. For example, participant 118A could change their perspective by turning their head, leaning over, or sitting down.

Figure 3C:
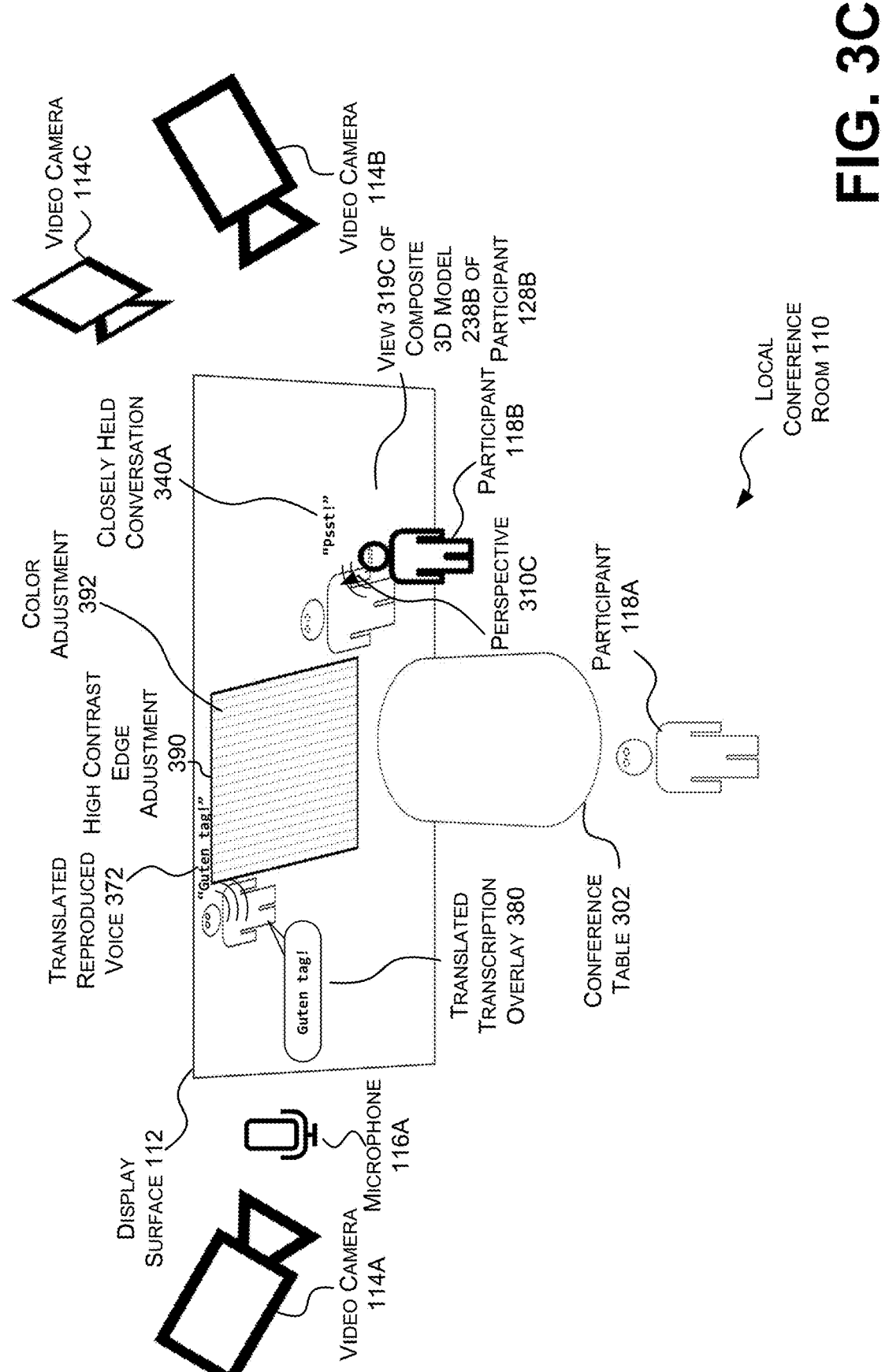
FIG. 3C illustrates another local participant simultaneously viewing a different 3D rendering of the scene at the remote conference room.

FIG. 3C illustrates local participant 118B viewing a different 3D rendering of remote conference room 120. As discussed herein, display surface 112 is capable of simultaneously presenting different images to different locations of local conference room 110. For example, display surface 112 may simultaneously display different content to local participants 118A and 118B. If stereoscopic images are supported, display surface 112 may simultaneously display different content to each eye of each of participants 118A and 118B—or however many participants 118 are present in local conference room 110.

FIG. 3A illustrates what content was visible on display surface 112 from the perspective of participant 118A at a particular point in time. FIG. 3C illustrates what local participant 118B saw rendered by display surface 112 at this same point in time. Throughout the drawing figures, the content depicted on display surface 112 is the content visible to the participant that is bolded—e.g., participant 118A in FIGS. 3A and 3B, and participant 118B in FIGS. 3C and 3D.

In some configurations, the view presented to a particular participant 118 may be adapted to that participant's preferences. For example, participants with a visual impairment may prefer a high contrast mode, while color blind participants may prefer a different color palette. Participants with hearing impairments may benefit from overlaying a transcript on the display surface 112, while participants that speak different languages may benefit from a real-time translation. In some configurations, text of a real-time translation may be overlaid on display surface 112, often in proximity to whomever was speaking. Additionally, or alternatively, a text-to-speech audio of the translation may replace the original audio. The ability of display surface 112 to present different display content to each participant 118 enables each participant 118 to be presented with a customized accommodation.

As discussed briefly above, some views presented by display surface 112 may be augmented or otherwise altered according to a preference of a particular participant 118. As illustrated, video conference engine 119 has augmented the view of 3D model 230 presented to participant 118B. As illustrated in FIG. 3A, participant 118A was not provided with the same augmentations.

Specifically, participant 118B prefers to speak German, and so participant 118B has registered with video conference engine 119 to have non-German languages translated into German. As illustrated, participant 128A of remote conference room 120 has said "hello" in English. Video conference engine 119 determines that "Hello!" is not German, and so it translates "Hello!" into the equivalent German "Guten tag!" for participant 118B. In some configurations, participant-specific customizations are applied by remote video conference engine 129.

Video conference engine 119 may present the translation in a number of ways. In some configurations, video conference engine 119 drives speakers 318 to say "Guten tag!" instead of the original "Hello!". Spatial audio may be used to ensure that participant 118B hears the translation into German while participant 118A still hears the original English "Hello!". Spatial audio may also be used to create the impression that "Guten tag!" originates from participant 128B—i.e., from where participant 128B appears to be located. Since remote conference room 120 appears to be in a location that is actually behind display surface 112, video conference engine 119 may use spatial audio to make it appear that "Guten tag!" originated from a location that is actually behind display surface 112.

Additionally, or alternatively, video conference engine 119 may augment the view of 3D model 230 with translated transcription overlay 380. Translated transcription overlay 380 may be positioned proximate to or partially overlapping with the rendition of remote participant 128A. Positioning a transcription overlay near the speaker helps participant 118B to determine who said what. In some configurations, transcription overlays are added to views of 3D model 230 for non-translated transcriptions.

Participant 118B may also have a visual impairment, and as such would prefer high contrast ratios, color adaptations, or other accommodations. As illustrated, color adjustment 392 of the depiction of conference table 202 may clarify, distinguish, or otherwise improve visibility to participant 118B. Similarly, high contrast edge adjustment 390 may highlight the border of conference table 202, increasing visibility.

FIG. 3C also illustrates an example of a closely held conversation 340A between local participant 118B and remote participant 128B. Remote participant 128B is initially facing away from display surface 122, as indicated by the dashed lines of the eyes of participant 128B. To get their attention, participant 118B whispers "Psst!" towards the rendition of remote participant 128B. In some configurations, the low volume used by participant 118 is mirrored when video conference engine 129 reproduces the sound in conference room 120. This low volume may alone be enough that participant 128B hears the "psst!" while participants 118A and 128A do not.

In other scenarios, video conference engine 119 and/or video conference engine 129 identify closely held conversations 340 by analyzing the volume and direction of a conversation and the apparent proximity of participants 118B and 128B. The lower the volume, the more the audio is directed to a specific participant, and the closer the potential participants are, the more likely it is that a conversation is determined to be closely held. One or more thresholds for one or more combinations of these values may be used to identify when a conversation is closely held.

A conversation may also be considered closely held if others appear to be excluded from it. Exclusion could be detected based on audio volume and direction or based on visual cues such as leaning in, covering one's mouth, etc. For example, a conversation is more likely to be considered closely held if the volume of a participant is estimated to be below an audible threshold. The threshold may be an absolute threshold, or the threshold may be based on how far the participant is from other participants—the actual distance from other participants in the same conference room and/or the apparent distance from other participants in the other conference room. For example, if participant 118B is determined to be speaking at a volume and in a direction such that participant 118A would not hear him, participant 118B may be more likely to be engaged in a closely held conversation with participant 128B. An example of a video-based determination of a closely-held conversation is a determination that participant 118B is holding up their hand and speaking near the image of the ear of participant 128B.

If one of the video conference engines determines that a conversation is closely held, it may not reproduce speech that is part of the closely held conversation for those outside of the conversation. Closely held conversations are a common occurrence in real world meetings. Simulating a closely held conversation between conference rooms furthers the impression that two groups of people in two different locations are conversing as if they were in the same room.

Figure 3D:
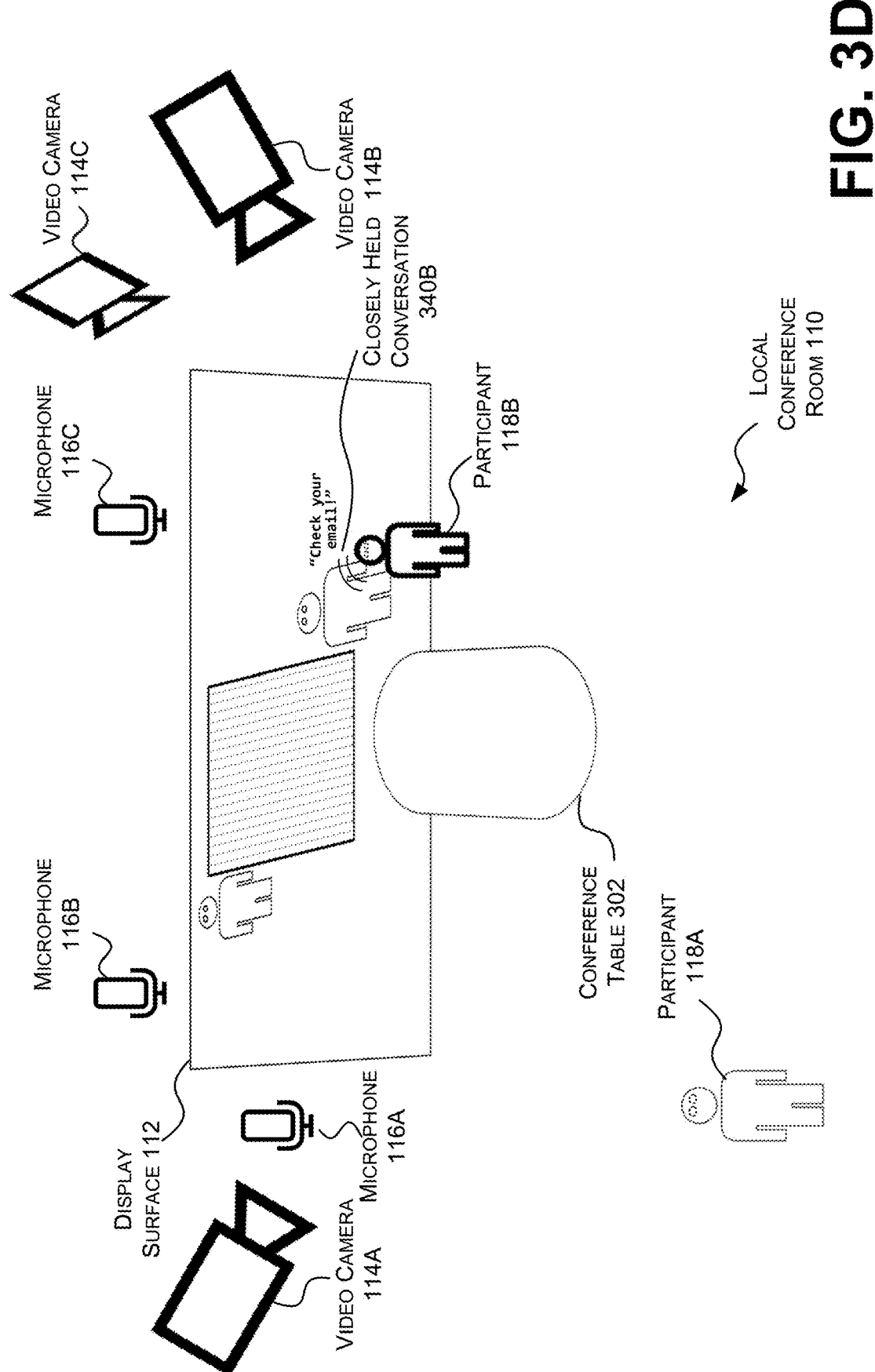
FIG. 3D illustrates the other local participant having a closely held conversation with one of the remote participants.

FIG. 3D illustrates local participant 118B having a closely held conversation with remote participant 128B. Remote participant 128B has turned around to face participant 118B. Audio recorded from local participant 118B and remote participant 128B will be reproduced for each other, but not for local participant 118A or remote participant 128A. Once one of participants 118B or 128B turn away from the other, or begins speaking with a volume and direction such that someone who was not in the closely held conversation could hear them, the closely held conversation may end and the audio from each participant 118B and 128B may resume being reproduced for other participants.

In some configurations, video conference engine 119 and/or video conference engine 129 may determine that participant 118B and remote participant 128B are taking part in a closely-held conversation based in part on a determination that they are making eye contact. For example, raw video data, eye location and tracking data, skeletonization data, and/or 3D models 230 and 330 may be analyzed to determine that the direction of the gazes of participants 118B and 128B are towards each other's eyes, within a defined threshold.

Turning now to FIG. 4, aspects of a routine for deep aperture video conferencing is shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

With reference to FIG. 4, routine 400 begins at operation 402, where three-dimensional model 230 of remote conference room 120 is received by video conference engine 119.

Next at operation 404, an emotional state of a remote participant 128A in the remote conference room 120 is received. The emotional state may be as determined by emotion and cue recognition engine 266.

Next at operation 406, a determination is made as to the perspectives of local participants 118 in local conference room 110.

Next at operation 408, video conference engine 119 computes different views of the 3D model 230 for different local participants 118. Each view is generated from the perspective of one of local participants 118. Renditions of the remote participant 128A are modified based on the determined emotional state of remote participant 128A. Each view is simultaneously displayed by display surface 112 so as to be visible to the corresponding local participant 118.

Proceeding to operation 410, one or more of the views are augmented according to individual preferences, as discussed above in conjunction with FIG. 3C.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 5:
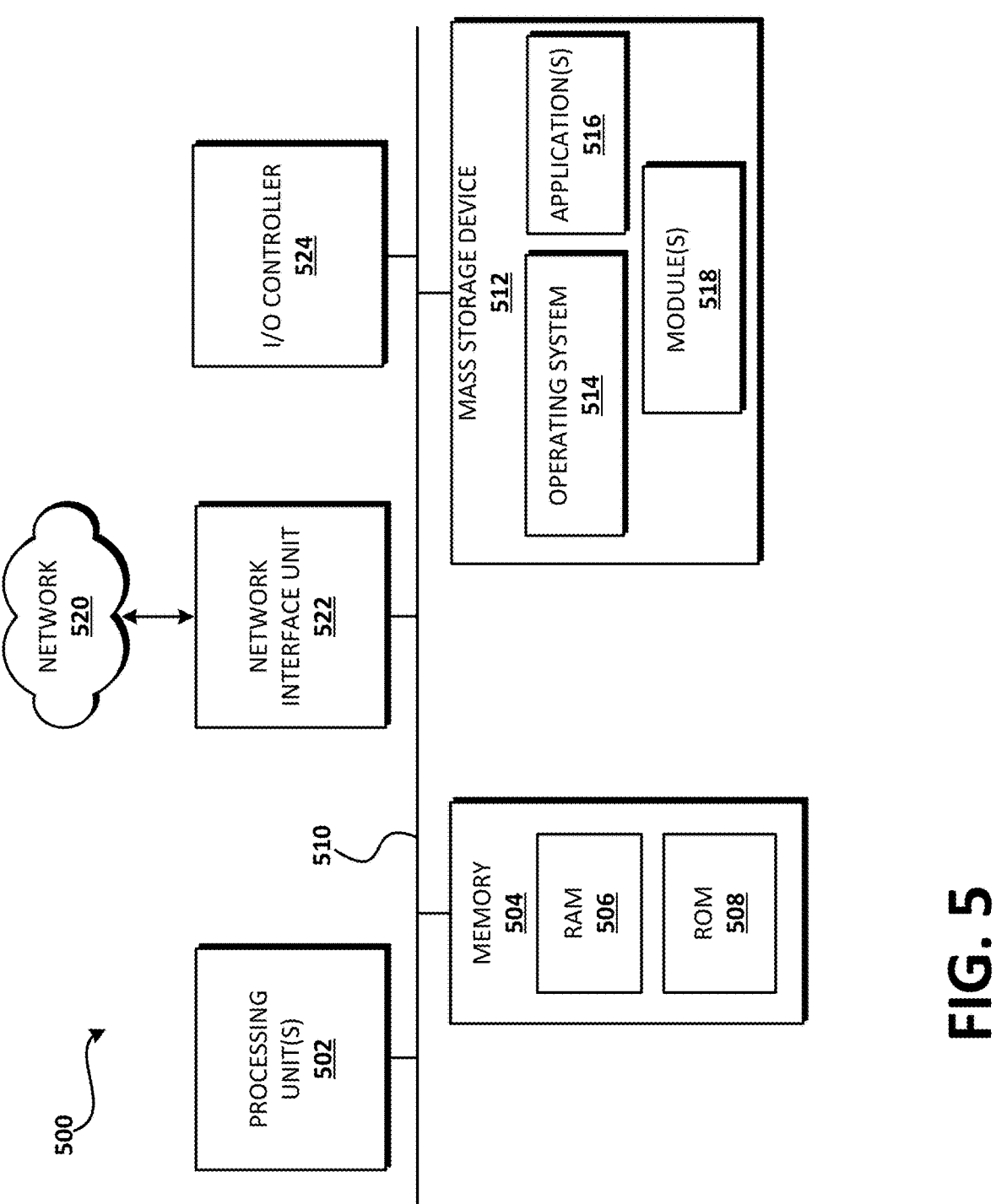
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a device, such as a computer or a server configured as part of the systems described herein, capable of executing computer instructions (e.g., a module or a program component described herein). The computer architecture 500 illustrated in FIG. 5 includes processing unit(s) 502, a system memory 504, including a random-access memory 506 ("RAM") and a read-only memory ("ROM") 508, and a system bus 510 that couples the memory 504 to the processing unit(s) 502.

Processing unit(s), such as processing unit(s) 502, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518, and other data described herein.

The mass storage device 512 is connected to processing unit(s) 502 through a mass storage controller connected to the bus 510. The mass storage device 512 and its associated computer-readable media provide non-volatile storage for the computer architecture 500. Although the description of computer-readable media contained herein refers to a mass storage device, it should be appreciated by those skilled in the art that computer-readable media can be any available computer-readable storage media or communication media that can be accessed by the computer architecture 500.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510. The computer architecture 500 also may include an input/output controller 524 for receiving and processing input from a number of other devices, including a keyboard, mouse, touch, or electronic stylus or pen. Similarly, the input/output controller 524 may provide output to a display screen, a printer, or other type of output device.

It should be appreciated that the software components described herein may, when loaded into the processing unit(s) 502 and executed, transform the processing unit(s) 502 and the overall computer architecture 500 from a general-purpose computing system into a special-purpose computing system customized to facilitate the functionality presented herein. The processing unit(s) 502 may be constructed from any number of transistors or other discrete circuit elements, which may individually or collectively assume any number of states. More specifically, the processing unit(s) 502 may operate as a finite-state machine, in response to executable instructions contained within the software modules disclosed herein. These computer-executable instructions may transform the processing unit(s) 502 by specifying how the processing unit(s) 502 transition between states, thereby transforming the transistors or other discrete hardware elements constituting the processing unit(s) 502.

FIG. 6 depicts an illustrative distributed computing environment 600 capable of executing the software components described herein. Thus, the distributed computing environment 600 illustrated in FIG. 6 can be utilized to execute any aspects of the software components presented herein. For example, the distributed computing environment 600 can be utilized to execute aspects of the software components described herein.

Accordingly, the distributed computing environment 600 can include a computing environment 602 operating on, in communication with, or as part of the network 604. The network 604 can include various access networks. One or more client devices 606A-606N (hereinafter referred to collectively and/or generically as "clients 606" and also referred to herein as computing devices 606) can communicate with the computing environment 602 via the network 604. In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602.

In various examples, the computing environment 602 includes servers 608, data storage 610, and one or more network interfaces 612. The servers 608 can host various services, virtual machines, portals, and/or other resources. In the illustrated configuration, the servers 608 host virtual machines 614, Web portals 616, mailbox services 618, storage services 620, and/or, social networking services 622. As shown in FIG. 6 the servers 608 also can host other services, applications, portals, and/or other resources ("other resources") 624.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more servers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the servers 608 and/or other data. That is, the datastores 626 also can host or store web page documents, word documents, presentation documents, data structures, algorithms for execution by a recommendation engine, and/or other data utilized by any application program. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the computing devices and the servers. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing the techniques disclosed herein, among other aspects.

The present disclosure is supplemented by the following example clauses.

Example 1: A method comprising: receiving a three-dimensional model of a remote space; determining a first perspective of a first local participant and a second perspective of a second local participant; generating a first individualized view of the three-dimensional model from the first perspective and a second individualized view of the three-dimensional model from the second perspective; simultaneously displaying the first and second individualized views on a display surface such that the first individualized view is observable by the first local participant and the second individualized view is observable by the second local participant.

Example 2: The method of example 1, wherein the first perspective of the first local participant is determined based on a location of a left eye and a right eye of the first local participant.

Example 3: The method of example 1, further comprising: determining a left eye location of the first local participant; and determining the perspective of the first local participant based on the left eye location and an orientation of the left eye in relation to a left eye socket.

Example 4: The method of example 3, wherein the display surface is capable of simultaneously displaying multiple pieces of content to different locations, wherein the first individualized view of the three-dimensional model comprises a left view and a right view, wherein the display surface simultaneously displays the left view so as to be visible to the left eye of the first local participant and the right view so as to be visible to the right eye of the first local participant, causing the first local participant to experience a three-dimensional perspective of the remote conference room.

Example 5: The method of example 1, further comprising: augmenting the first individualized view but not the second individualized view to modify the brightness, contrast, or color of some or all objects of the three-dimensional model.

Example 6: The method of example 1, wherein the three-dimensional model of the remote space includes spatial audio data captured from the remote space, the method further comprising: generating an audio stream from the spatial audio data, wherein the audio stream is directed to the first local participant, and wherein the audio stream reproduces a sound according to an apparent distance between the first local participant and the entity that produced the sound.

Example 7: The method of example 1, wherein the remote space comprises a remote conference room with a remote display surface that simultaneously renders one or more views of a three-dimensional model of the local space, and wherein the local space comprises a local conference room.

Example 8: A computing device comprising: one or more processors; a memory in communication with the one or more processors, the memory having computer-readable instructions stored thereupon which, when executed by the one or more processors, cause the computing device to: receive a three-dimensional model of a remote video conference room and a remote participant; receive data indicating an emotional state of the remote participant; determine a first perspective of a first local participant and a second perspective of a second local participant; generate a first individualized view of the three-dimensional model from the first perspective and a second individualized view of the three-dimensional model from the second perspective, wherein a portion of the first individualized view that depicts the remote participant is augmented to emphasize the emotional state of the remote participant; and simultaneously display the first and second individualized views on a display surface such that the first individualized view is observable by the first local participant and the second individualized view is observable by the second local participant.

Example 9: The computing device of example 8, wherein the instructions further cause the processor to: determine that a perspective of the remote participant passes within a defined distance of an eye of the first participant, wherein the first individualized view is generated to include the remote participant making eye contact with the first local participant.

Example 10: The computing device of example 8, wherein the instructions further cause the processor to: track changes in the first perspective of the first local participant as a location or orientation of the eyes of the first local participant change; receive updates to the three-dimensional model; and update the first individualized view to display the updated three-dimensional model from a current perspective of the first local participant.

Example 11: The computing device of example 8, wherein the emotional state of the remote participant is emphasized by exaggerating an expression that indicative of the emotional state.

Example 12: The computing device of example 8, wherein the three-dimensional model of the remote conference room includes spatial audio data captured from the remote conference room, wherein the instructions further cause the processor to: translate speech produced by the remote participant to a different language; and augment the first individualized view with a caption proximate to the remote participant.

Example 13: The computing device of example 8, wherein the three-dimensional model of the remote conference room includes spatial audio data captured from the remote conference room, wherein the instructions further cause the processor to: filter out audio determined by the spatial audio data to have originated from outside the remote conference room.

Example 14: The computing device of example 8, wherein the first and second individualized views displayed by the display surface create the impression that the remote conference room is adjacent to a local conference room, wherein the first and second local participants are located in the local conference room.

Example 15: A computer-readable storage medium comprising instructions that, when executed by a processor, cause the processor to: receive a three-dimensional model of a remote video conference room and a remote participant; receive spatial audio data of the remote video conference room; determine a first perspective of a first local participant and a second perspective of a second local participant; generate a first individualized view of the three-dimensional model from the first perspective and a second individualized view of the three-dimensional model from the second perspective; simultaneously display the first and second individualized views on a display surface such that the first individualized view is observable by the first local participant and the second individualized view is observable by the second local participant; generate an audio stream directed to the first local participant that mimics what the first local participant would hear from the remote conference room if the remote conference room was adjacent to the local conference room.

Example 16: The computer-readable storage medium of example 15, wherein the display surface covers a substantial portion of a wall of the local conference room.

Example 17: The computer-readable storage medium of example 16, wherein a plurality of microphones embedded in or around the display surface capture spatial audio of the local conference room for transmission to the remote conference room.

Example 18: The computer-readable storage medium of example 17, wherein speakers embedded in or around the display surface generate noise canceling audio waves based on the spatial audio captured by the plurality of microphones.

Example 19: The computer-readable storage medium of example 15, wherein the audio stream is adjusted based on an acoustic profile of the local conference room.

Example 20: The computer-readable storage medium of example 15, wherein the instructions further cause the processor to: determine if the first local participant is speaking quietly in a closely-held conversation that is split across the local conference room and the remote conference room; and limiting audio reproductions of the first local participant to other participants of the closely-held conversation.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
receiving a three-dimensional model of a remote space;
determining a first perspective of a first local participant and a second perspective of a second local participant;
generating a first individualized view of the three-dimensional model from the first perspective and a second individualized view of the three-dimensional model from the second perspective;
simultaneously displaying the first and second individualized views on a display surface such that the first individualized view is observable by the first local participant and the second individualized view is observable by the second local participant;
determining that the first local participant and a remote participant are engaged in a closely-held conversation based on a determination that an apparent proximity of the first local participant and the remote participant is less than a defined threshold value, wherein the apparent proximity is based in part on the first perspective of the first local participant including a physical distance between the first local participant and the display surface; and
limiting audio reproductions of the first local participant to the remote participant.

2. The method of claim 1, wherein the first perspective of the first local participant is determined based on a location of a left eye and a right eye of the first local participant.

3. The method of claim 1, further comprising:
determining a left eye location of a left eye of the first local participant; and
determining the perspective of the first local participant based on the left eye location and an orientation of the left eye in relation to a left eye socket of the first local participant.

4. The method of claim 3, wherein the display surface uses a lenticular lens to simultaneously display multiple pieces of content to different locations, wherein the first individualized view of the three-dimensional model comprises a left view and a right view, wherein the lenticular lens of the display surface simultaneously displays the left view so as to be visible to the left eye of the first local participant and the right view so as to be visible to a right eye of the first local participant, causing the first local participant to experience a three-dimensional perspective of the remote conference room.

5. The method of claim 1, further comprising:
augmenting the first individualized view but not the second individualized view to modify the brightness, contrast, or color of some or all objects of the three-dimensional model.

6. The method of claim 1, further comprising:
receiving spatial audio data captured from an entity in the remote space;
generating an audio stream from the spatial audio data, wherein the audio stream is directed to the first local participant, and wherein the audio stream reproduces a sound according to an apparent distance between the first local participant and the entity that produced the sound.

7. The method of claim 1, wherein the remote space comprises a remote conference room with a remote display surface that simultaneously renders one or more views of a three-dimensional model of the local space, and wherein the local space comprises a local conference room.

8. A computing device comprising:
one or more processors;
a memory in communication with the one or more processors, the memory having computer-readable instructions stored thereupon which, when executed by the one or more processors, cause the computing device to:
receive a three-dimensional model of a remote video conference room and a remote participant;
receive data indicating an emotional state of the remote participant;
determine a first perspective of a first local participant and a second perspective of a second local participant;

generate a first individualized view of the three-dimensional model from the first perspective and a second individualized view of the three-dimensional model from the second perspective, wherein a portion of the first individualized view that depicts the remote participant is augmented to emphasize the emotional state of the remote participant; and simultaneously display the first and second individualized views on a display surface such that the first individualized view is observable by the first local participant and the second individualized view is observable by the second local participant;

determine that the first local participant and a remote participant are engaged in a closely-held conversation based on a determination that an apparent proximity of the first local participant and the remote participant is less than a defined threshold value, wherein the apparent proximity is based in part on the first perspective of the first local participant including a physical distance between the first local participant and the display surface; and limit audio reproductions of the first local participant to the remote participant.

9. The computing device of claim 8, wherein the instructions further cause the processor to:

determine that a perspective of the remote participant passes within a defined distance of an eye of the first participant, wherein the first individualized view is generated to include the remote participant making eye contact with the first local participant.

10. The computing device of claim 8, wherein the instructions further cause the processor to:

track changes in the first perspective of the first local participant as a location or orientation of the eyes of the first local participant change;

receive updates to the three-dimensional model; and update the first individualized view to display the updated three-dimensional model from a current perspective of the first local participant.

11. The computing device of claim 8, wherein the emotional state of the remote participant is highlighted by restoring an expression indicative of the emotional state.

12. The computing device of claim 8, wherein the instructions further cause the processor to:

receive spatial audio data captured from the remote conference room;

translate speech produced by the remote participant to a different language; and augment the first individualized view with a caption proximate to the remote participant.

13. The computing device of claim 8, wherein the instructions further cause the processor to:

receive spatial audio data captured from the remote conference room; and filter out audio determined by the spatial audio data to have originated from outside the remote conference room.

14. The computing device of claim 8, wherein the first and second individualized views displayed by the display surface create the impression that the remote conference room is adjacent to a local conference room, and wherein the first and second local participants are located in the local conference room.

15. A computer-readable storage medium comprising instructions that, when executed by a processor, cause the processor to:

receive a three-dimensional model of a remote video conference room and a remote participant;

receive spatial audio data of a remote video conference room;

determine a first perspective of a first local participant and a second perspective of a second local participant;

generate a first individualized view of the three-dimensional model from the first perspective and a second individualized view of the three-dimensional model from the second perspective;

simultaneously display the first and second individualized views on a display surface such that the first individualized view is observable by the first local participant and the second individualized view is observable by the second local participant;

generate an audio stream directed to the first local participant that mimics what the first local participant would hear from the remote conference room if the remote conference room was adjacent to a local conference room;

determining that the first local participant and a remote participant are engaged in a closely-held conversation based on a determination that an apparent proximity of the first local participant and the remote participant is less than a defined threshold value, wherein the apparent proximity is based in part on the first perspective of the first local participant including a physical distance between the first local participant and the display surface; and limiting audio reproductions of the first local participant to the remote participant.

16. The computer-readable storage medium of claim 15, wherein the display surface creates a virtual window into the remote conference room.

17. The computer-readable storage medium of claim 15, wherein a plurality of microphones embedded in or around the display surface capture spatial audio of the local conference room for transmission to the remote conference room.

18. The computer-readable storage medium of claim 17, wherein speakers embedded in or around the display surface generate noise canceling audio waves based on the spatial audio captured by the plurality of microphones.

19. The computer-readable storage medium of claim 15, wherein the instructions further cause the processor to:

determine that the first local participant and the remote participant are looking at each other by:

acquiring gaze directions from eye locations and eye orientations of the first local participant and the remote participant, analyzing skeletonizations of the first local participant and the remote participant to determine locations of eyes of the first local participant and the remote participant, and determining whether the gaze directions of the first local participant and the remote participant intersect the locations of the eyes of the other participant; and updating the first individualized view to improve eye contact between the first local participant and the remote participant.

20. The computer-readable storage medium of claim 15, wherein the instructions further cause the processor to:

determine if the first local participant is speaking quietly in a closely-held conversation that is split across the local conference room and the remote conference room; and limiting audio reproductions of the first local participant to other participants of the closely-held conversation.

* * * * *